US012613041B2

(12) United States Patent
Sachdev et al.

(10) Patent No.: US 12,613,041 B2
(45) Date of Patent: Apr. 28, 2026

(54) SYSTEM AND METHOD FOR REMOVAL OF MOISTURE AND OTHER SORBATES

(71) Applicant: BRY AIR [ASIA] PVT. LTD., Delhi (IN)

(72) Inventors: Rajan Sachdev, Delhi (IN); Varun Pahwa, Delhi (IN); Manish Malik, Najafgarh (IN); Deepak Pahwa, Delhi (IN); Kuldeep Singh Malik, Najafgarh (IN); Sachin Dhiman, Panipat (IN)

(73) Assignee: BRY-AIR [ASIA] PVT. LTD., Delhi (IN)

( * ) Notice: Subject to any disclaimer, the term of this patent is extended or adjusted under 35 U.S.C. 154(b) by 312 days.

(21) Appl. No.: 18/254,342

(22) PCT Filed: Aug. 12, 2022

(86) PCT No.: PCT/IN2022/050728
§ 371 (c)(1),
(2) Date: May 24, 2023

(87) PCT Pub. No.: WO2023/017545
PCT Pub. Date: Feb. 16, 2023

(65) Prior Publication Data
US 2024/0019135 A1      Jan. 18, 2024

(30) Foreign Application Priority Data
Aug. 12, 2021      (IN) .............................. 202111036425

(51) Int. Cl.
*B01D 53/02*          (2006.01)
*B01D 53/06*          (2006.01)
(Continued)

(52) U.S. Cl.
CPC ............ *F24F 3/1423* (2013.01); *B01D 53/06* (2013.01); *B01D 53/261* (2013.01);
(Continued)

(58) Field of Classification Search
CPC ........ B01D 2253/106; B01D 2253/116; B01D 2253/204; B01D 2257/504;
(Continued)

(56) References Cited

U.S. PATENT DOCUMENTS

| 7,101,414 B2 | 9/2006 | Dinnage et al. |
| 10,702,825 B2 | 7/2020 | Jin et al. |

(Continued)

FOREIGN PATENT DOCUMENTS

| WO | 2011161693 A1 | 12/2011 |
| WO | 2020006564 A1 | 1/2020 |
| WO | 2020178436 A1 | 9/2020 |

OTHER PUBLICATIONS

International Search Report for PCT/IN2022/050728 mailed Nov. 29, 2022, 3 pages.

(Continued)

*Primary Examiner* — Christopher P Jones
(74) *Attorney, Agent, or Firm* — Nixon & Vanderhye, PC

(57) ABSTRACT

Described herein is an apparatus and method for removing moisture and/or sorbates from airstream and/or other fluid. The system comprises a preconditioning desiccant wheel and a main desiccant wheel. The preconditioning desiccant wheel comprises of at least two first sectors for allowing air to pass therethrough, including a first process sector and a first reactivation sector. The main desiccant wheel comprises of at least three second sectors for allowing air to pass therethrough, sequentially including a second outside air sector, a second process sector, and a second reactivation sector. The ambient airstream is sequentially dehumidified in one of the at least two sectors of the preconditioning desiccant wheel and the outside air sector of the main (Continued)

desiccant wheel, before being at least partially supplied for reactivation to the reactivation sector of the main desiccant wheel.

35 Claims, 5 Drawing Sheets

(51) Int. Cl.
  *B01D 53/26*     (2006.01)
  *F24F 3/14*     (2006.01)
(52) U.S. Cl.
  CPC ...... *B01D 53/265* (2013.01); *B01D 2253/106* (2013.01); *B01D 2253/116* (2013.01); *B01D 2253/204* (2013.01); *B01D 2257/504* (2013.01); *B01D 2257/708* (2013.01); *B01D 2257/80* (2013.01); *B01D 2259/4009* (2013.01); *B01D 2259/4508* (2013.01); *F24F 2003/1446* (2013.01); *F24F 2203/1032* (2013.01)

(58) Field of Classification Search
  CPC .......... B01D 2257/708; B01D 2257/80; B01D 2258/06; B01D 2259/4009; B01D 2259/4508; B01D 53/06; B01D 53/261; B01D 53/265; F24F 2003/1446; F24F 2203/1032; F24F 3/1423
  See application file for complete search history.

(56) References Cited

U.S. PATENT DOCUMENTS

| | | |
|---|---|---|
| 2005/0204914 A1 | 9/2005 | Boutall |
| 2013/0160644 A1 | 6/2013 | Pahwa et al. |

OTHER PUBLICATIONS

Written Opinion of the ISA for PCT/IN2022/050728 mailed Nov. 29, 2022, 10 pages.

FIG. - 2

Prior Art

Present Invention

Main section (51)

Preconditioning section (50)

Pre - Conditioning Desiccant Wheel

Main Desiccant Wheel

Present Invention

Main Section (51)

Preconditioning section (50)

supplementary preconditioning section (52)

Main Desiccant Wheel

Pre - Conditioning Desiccant Wheel

Supplementary Pre - Conditioning Desiccant Wheel

SYSTEM AND METHOD FOR REMOVAL OF MOISTURE AND OTHER SORBATES

CROSS-REFERENCE TO RELATED APPLICATIONS

This application is the U.S. national phase of International Application No. PCT/IN2022/050728 filed Aug. 12, 2022, which designated the U.S. and claims priority to IN 202111036425 filed Aug. 12, 2021, the entire contents of each of which are hereby incorporated by reference.

FIELD OF THE INVENTION

Within the field of HVAC (heating ventilation and air conditioning) and other industrial processes, desiccant systems are now commonly used for removing moisture or other sorbates from air and/or other fluids. More specifically, rotary desiccant systems are used in applications requiring low humidity in production areas and for process needs, e.g. food and pharmaceuticals. One emergent application is the production of Lithium-ion cells for which very low humidity (less than 1%) is becoming essential. As desiccant systems consume a lot of energy for reactivation, such applications and their solutions for low humidity production require innovative solutions for reduction of energy for thermal reactivation of such desiccant dehumidification equipment.

BACKGROUND OF THE INVENTION

The present invention provides a novel system and method for removal of moisture and other sorbates from air and other fluids, particularly from air or other gases using a solid desiccant material. The present invention relates more specifically to environmentally friendly systems wherein not only is energy saving provided for, an overall saving on environmentally degrading footprints are avoided or minimized substantially without compromise on performance.

More than 90% of low dew point jobs require –40° C. dew point inside the production space/dry room, and, therefore, to meet this condition the system including a desiccant (wheel) will be required to produced dry air in the range of –50 to –60° C. dew point to meet the moisture load requirements inside the room.

One such industry is that of cell/battery production using Lithium ion or emerging alternate technologies, which is usually done in a dry room which requires a dew point of –40° C. (DP). Lithium cell production industry is likely to increase in scope exponentially over the next decade. Also, the cell production technologies call for a significant amount of room exhaust air, ventilation air, and therefore fresh air. The industry experience is that 40-60% of the total energy required to produce Li ion cells is required only for the dehumidification system, in such a system. There is therefore a challenge to provide methods and/or systems for dehumidification which require less energy.

The objective significantly meets the varying and large fresh air needs based on different production technology, techniques, and/or processes, with minimum regeneration energy usage. It would be also advantageous to explore the possibility of co-opting new materials in such new methods and systems in the regeneration at low temperatures, such as 60-80° C. as compared to traditional systems, with the regeneration temperature between 120 to 220° C., through electrical means or optionally through conventional low-grade heat from solar thermal, waste heat etc. While addressing an important need for cell/battery production using Lithium ion or emerging alternate technologies, this also opens up potential for implementation in general industrial dehumidification using low temperature heat sources and/or dehumidification requirements seen in the range of 25-40%, that are typical in food or pharma production/processing units.

The purpose of the system and method provided herein is to enable achievement of significantly important objectives:
- energy savings across industry using desiccant wheels;
- maintenance of low dew point (typically <–40° C. to –80° C.) in dry rooms/work spaces;
- ensure reduction in energy consumption of the equipment/system used to achieve low dew points;
- also ensure flexibility in the ability to handle high fresh air requirements as may be required by or in manufacturing areas/dry rooms such as in production of lithium ion cells; and
- low energy consumption—preferably through low temperature regeneration;

The objective of the invention also allows for incorporation of desiccant wheels using new materials/adsorbents, which provide high moisture removal and require low temperature regeneration e.g. specifically in the range of 60-80° C. more broadly in the range of 50-100° C.

Another objective of the invention is to achieve low sorbate concentration of not only $H2O$/moisture but also $CO2$, and VOC's. For VOC's, etc., this method and system of the invention also provides and helps in reducing cross-contamination between different air streams.

These and other objectives of the invention are achieved by an elegant method whereby a component of prior art systems and methods, viz., discharge air is itself reused to supply the necessary heat requirements—thereby firstly reducing energy requirements, secondly ensuring fresh air maintenance, and thirdly in some requirements, also ensuring that the equipment outlet dew point achievement is at levels not hitherto thought commercially feasible, viz., <–70° C. to –90° C., thereby achieving a work space dew point requirement of <–40° C. to –80° C.

While the present invention is implemented in a rotary bed sorption system, it can also be adapted for implementation to bed/batch sorption systems.

The use of rotary bed sorption systems to collect a sorbate from a process fluid stream and transfer it in a concentrated form to a regeneration fluid stream is well known. The sorbates that are typically removed include water vapor, volatile organic compounds ("VOCs"), and the like.

Some prior art identify/state that a typical problem of such systems is the potential for cross-contamination between the process stream and the regeneration stream, which is however not an industry experience, but in exceptional such cases, the present invention can reduce or even avoid any cross contamination.

DESCRIPTION OF THE PRIOR ARTS

At this stage, and in order to provide the background and context to what has been achieved through the present invention, a summary review of prior art and related art available to the Applicants is given below.

US Patent Publication 2019/0022574 (now U.S. Pat. No. 10,702,825) discloses an air dehumidification apparatus. This disclosure teaches an apparatus where outside air is cooled and dehumidified by a pre-cooler to pass through an adsorption zone of a carbon dioxide adsorbing rotor, producing air having a low carbon dioxide concentration which is cooled by an intercooler. The air that has passed through the intercooler is passed through an adsorption zone of a moisture adsorption rotor and then supplied to a low humidity working chamber. Return air from the low humidity working chamber may be mixed with the air leaving the pre-cooler. A part of the air which passed through the intercooler is branched to pass through a purge zone of the moisture adsorption rotor before being sent to a regeneration zone of the humidity adsorption rotor at regeneration inlet temperature of 220° C. Air that passed through the regeneration zone of the humidity adsorption rotor is mixed with outside air and then passed through a regeneration zone of the carbon dioxide adsorption rotor before being exhausted.

WO 2020/006564 teaches a rotary sorption bed system includes a rotating sorbent mass of a regenerable sorbent material, in a cycle of operation, a given volume of the sorbent mass sequentially passing through first, second, third, fourth, and fifth zones, before returning to the first zone; a process fluid stream directed through the first zone; a regeneration fluid stream directed through the third zone; and an isolation fluid stream that recirculates in a closed loop independent of the process fluid stream and the regeneration fluid stream through the second and fourth zones. The regeneration fluid stream passes through the fifth zone before passing through the third zone at regeneration inlet temperature of 325° F. (162° C.).

WO 2020/178436 teaches a 3-rotor drying system for producing technical air having a very low dew point comprising three rotary desiccant dryers, each rotary desiccant dryer comprising a drying sector and a regeneration sector, the rotary desiccant dryers arranged in sequence and sharing a common regeneration-air flow path for passing regeneration-air through the respective regeneration sectors of the rotary desiccant dryers and a common intake-air flow path for passing intake-air through the respective drying sectors of the rotary desiccant dryers for dehumidifying the intake-air to product-air having a very low dew point.

It is important to understand that while heat, a combination of mass flow and temperature, is added to air/fluid used for regenerating a desiccant wheel, the process air "out" dew point achievable is limited by the RH (relative humidity) of the air/fluid entering the wheel for regeneration.

In other words, the RH of the process "out" air/fluid will be higher than the RH of the reactivation inlet air/fluid. Hence, the lower the RH of the reactivation inlet air/fluid, the lower is the possible RH and dew point that can be achieved of the process "out" air/fluid. The RH of the regeneration air/fluid can be reduced by either, or, or a combination of, increasing the reactivation "in" temperature and/or lowering the reactivation inlet moisture content/dew point (hence RH).

U.S. Pat. No. 7,101,414 teaches a method of reducing sorbate concentration of a process fluid stream using a sorption bed system and includes the following. A mass of a sorbent material is rotated so that, in a cycle of operation, a given volume of the sorbent mass sequentially passes through first, second, third, fourth, fifth, and sixth zones, before returning to the first zone. A process fluid stream is passed through the sorbent mass in the first zone, and a regeneration fluid stream is passed through the sorbent mass in the fourth zone at regeneration inlet temperature of 335° F. (135° C.). A first isolation fluid stream is recycled in a closed loop, independent of the process fluid stream and the regeneration fluid stream, between the sorbent mass in the second zone and in the sixth zone. A second isolation fluid stream, is meanwhile recycled in a closed loop, independent of the process fluid stream, the regeneration fluid stream, and first isolation fluid stream, between the sorbent mass in the third zone and in the fifth zone.

WO 2011/161693 teaches a method and apparatus for energy-efficient desiccant dehumidification of air or other gases to low humidity levels is disclosed. The method and apparatus includes a desiccant rotor (wheel) having more than one dehumidification zone or sector. Separate dehumidification sectors may be used to dehumidify separate air or gas streams, or they may be used to dehumidify a single air or gas stream by passing it through more than one sector. All or a portion of the discharge air or gas from a dehumidification sector is used for all or a portion of reactivation inlet air or gas prior to heating. The desiccant wheel may include more than one reactivation sector, with separate air or gas sources for each sector. The desiccant wheel may include a purge sector between the reactivation and dehumidification sectors to improve the thermal efficiency of the dehumidification process.

It is recognized in the art that the maximum energy consumption in such systems is due to the requirement for maintenance of low dew points.

While several such issues have been identified in the prior art, the focus, for example in U.S. Pat. No. 7,101,414 (U.S. Pat. No. '414), had been largely towards preventing cross-contamination. As discussed above, U.S. '414 as far back as 2005 reports a method for reducing sorbate concentration in a process fluid stream in a rotary bed sorption system. The method of this patent uses the concept of isolation loops to reduce such cross-contamination. The isolation loops/zones can be one or more in number are stated to be enable the reduction of diffusion of moisture through the sorbent matrix from a high concentration fluid stream or reduce the carry-over of vapour from a high pressure fluid stream to a low pressure fluid stream. This disclosure focuses of providing multiple isolation loops whereby preferably, the direction of fluid flow in the 1st, 5th and 6th zones is the same, and the direction of the fluid flow in the 2nd, 3rd and 4th zones is the same, and is opposite to the first fluid flow (through the 1st, 5th and 6th zones).

WO 2020/006564 is another more recent prior art—and purports to be a developments/advance over U.S. Pat. No. 7,101,414. WO'564 states that it uses a recycled isolation loop and purge/regeneration loop in combination over the basic technology covered in U.S. '414. This disclosure states that the purge/regeneration loop uses warm air from a zone of the rotor after the regeneration zone to preheat the air to be further heated for supply to the regeneration zone. The recycled isolation loop cools the rotor on the process inlet side and also pre-warms the rotor before it enters the regeneration sector.

U.S. Pat. No. 9,303,884 belonging to the Applicants provided a system and a method by which energy-efficient desiccant dehumidification of air or other gases to low humidity levels was provided. The method and apparatus of U.S. '884 includes a desiccant rotor (wheel) having more than one dehumidification zone or sector. Separate dehumidification sectors may be used to dehumidify separate air or gas streams, or they may be used to dehumidify a single air or gas stream by passing it through more than one sector. All or a portion of the discharge air or gas from a dehumidification sector is used for all or a portion of reactivation inlet air or gas prior to heating. The desiccant wheel may include more than one reactivation sector, with separate air or gas sources for each sector. The desiccant wheel may include a purge sector between the reactivation and dehumidification sectors to improve the thermal efficiency of the dehumidification process. The system of this prior art enabled the delivery of 100% outside air using a single rotor wheel at dew points of <−60 F but with considerably higher reactivation energy consumption.

FIG. 1 is a schematic representation of a prior art dehumidifier system as depicted in FIG. 4 of U.S. Pat. No. 9,303,884, and shows the basic arrangement of a desiccant rotor (1) sequentially including a process sector (2), a purge sector (4), and a reactivation sector (3). In this arrangement, an ambient airstream (12) is initially cooled in a first cooling unit (6), and is mixed to a return airstream (13). The mixture of the ambient airstream (12) and the return airstream (13) is termed as a process inlet airstream (14). The process inlet airstream (14) is cooled in a second cooling unit (8). A portion of the process inlet airstream (14) is passed through the process sector (2), to be dehumidified therein. With such dehumidification, the moisture in the process inlet airstream (14), is adsorbed at the desiccant placed in the process sector (2) of the wheel (1), to output a process outlet airstream (15). Moreover, in this arrangement, remaining portion of the process inlet airstream (14), i.e. the purge air (26), is passed through the purge sector (4) of the wheel (1). The direction of the purge air 26 is typically concurrent with the process outlet airstream (15), and counter-current to a reactivation inlet airstream (16). In one embodiment, the source of the purge air 26 may be a portion of the process inlet air 14 passed through the second cooling coil (8). The purge air (26) exiting from the purge sector (4), and having picked up the heat carryover from the reactivation sector (3), is fed to the reactivation sector (3), as reactivation inlet airstream (16). Notably, the purge air (26) exiting from the purge sector (4) is heated by a first heating unit (10), to output the reactivation inlet airstream (16). The reactivation inlet airstream (16) is then passed through the reactivation sector (3), such that the reactivation inlet airstream (16) takes up moisture from the desiccant positioned therein, to be dehumidified and output the reactivation outlet airstream (17). The reactivation outlet airstream (17) is then vent to external environment, as regeneration outlet air (19). This configuration has its limitations in delivering the desired dew points without considerable use of reactivation heat/energy.

Figure 2:
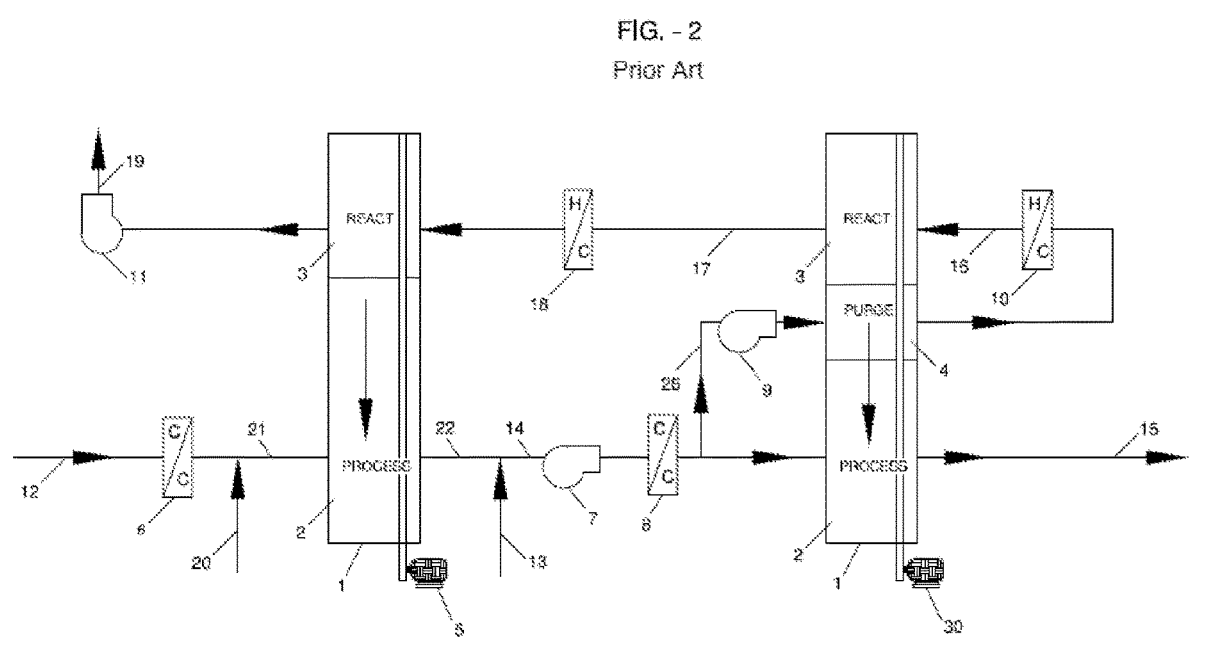

FIG. 2 as stated above is a schematic representation of the prior art dehumidifier system shown as FIG. 6 in U.S. Pat. No. 9,303,884. This system uses two dehumidifiers wheels in series to address the high makeup/pressurization of air fractions requirements and/or extremely low humidity required for some applications, but does this at a considerable energy penalty. In this arrangement, a separate dehumidifier unit is used to pre-treat the mixture of pressurization/make up air (20) and ambient air (12) and reduce the humidity load on the downstream process load dehumidifier. When using this arrangement for cell manufacturing applications, one dehumidifier has to unnecessarily pre-dehumidify the mixture of pressurization/make up air (20) and outside air and reactivation air (17) for a plurality of room or process air dehumidifiers, with total system requiring two large reactivation heating batteries.

FIG. 3 is a schematic representation of a prior art dehumidification system for low dew point applications, as depicted in FIG. 7 of U.S. Pat. No. 9,303,884, also shows the basic arrangement of a desiccant dehumidifier with at least one additional sector i.e. an outside air (OSA) sector (4). In this arrangement, a third airstream i.e. the makeup air (26) is passed through the wheel (1) sequentially between the reactivation sector (3), and process sector (2). The direction of the outside inlet air (12) is typically concurrent with the process air flow (15) and counter-current to the reactivation airflow (16). The source of the process inlet air (14) may be a mixture of the process return air (13) or air from another source and make up air (26), such as air passed through the first cooling unit (6).

The aforementioned embodiment of dehumidification system, is relatively less energy efficient, as compared to the dehumidification system of the present invention. Embodiments disclosing concepts of the present disclosure, will now be explained in details.

It is pertinent that all the above disclosures do not talk of the objectives of this present invention. The Applicants have been unable to locate any art that can provide for energy savings through reduction in energy consumption; and also ensure maintenance of typically increasingly high fresh air requirements in industrial production units in sorption systems.

OBJECTS OF THE CURRENT INVENTION

The purpose of the system and method provided herein is to enable achievement of significantly important objectives:
  energy savings across industry using desiccant wheels;
  maintenance of low dew point (typically <−40° C. to −80° C.) in dry rooms/work spaces;
  ensure reduction in energy consumption of the equipment/ system used to achieve low dew points;
  also ensure flexibility in the ability to handle high fresh air requirements as may be required by or in manufacturing areas/dry rooms such as in production of lithium ion cells; and
  low energy consumption—preferably through low temperature regeneration;
The objective of the invention also allows for incorporation of desiccant wheels using new materials/adsorbents, which provide high moisture removal and require low temperature regeneration e.g. specifically in the range of 60-80° C. more broadly in the range of 50-100° C.

Another objective of the invention is to achieve low sorbate concentration of not only H2O/moisture but also CO2, and VOC's. For VOC's, etc., this method and system of the invention also provides and helps in reducing cross-contamination between different air streams.

These and other objectives of the invention are achieved by an elegant method whereby a component of prior art systems and methods, viz., discharge air is itself reused to supply the necessary heat requirements—thereby firstly reducing energy requirements, secondly ensuring fresh air maintenance, and thirdly in some requirements, also ensuring that the equipment outlet dew point achievement is at levels not hitherto thought commercially feasible, viz., <−70° C. to −90° C., thereby achieving a work space dew point requirement of <−40° C. to −80° C.

While the present invention is implemented in a rotary bed sorption system, it can also be adapted for implementation to bed/batch sorption systems.

In the present invention, with the preconditioning sector, and/or a preconditioning wheel, the dew point into the reactivation "in" can be substantially reduced, thereby allowing a very low RH even with low regeneration inlet temperature.

SUMMARY OF THE INVENTION

One aspect of the present disclosure relates to an apparatus for removing moisture and/or sorbates from airstream and/or other fluid. The apparatus comprises: a preconditioning section of the apparatus comprising a preconditioning desiccant wheel; and a main section of the apparatus comprising a main desiccant wheel. The preconditioning desiccant wheel comprises of two first sectors, namely a first process sector and a first reactivation sector. The main desiccant wheel comprises of at least three second sectors, sequentially including a second outside air sector, a second reactivation sector, and a second process sector. The ambient airstream is sequentially dehumidified in the first process sector of the preconditioning desiccant wheel followed by dehumidification in the second outside air sector of the main desiccant wheel, before being at least partially supplied for sequential reactivation with a heating unit (10) at the second reactivation sector of the main desiccant wheel followed by supplying to the first reactivation sector of the preconditioning desiccant wheel. Furthermore, the second process sector of the main desiccant wheel receives and dehumidifies a combination of a recirculated airstream from a cooling space and at least the portion of the second preconditioned airstream, to output a dehumidified cooled airstream to the cooling space.

Another aspect of the present disclosure relates to an apparatus for removing moisture and/or sorbates from airstream and/or other fluid. The apparatus comprises: a preconditioning section of the apparatus comprising a preconditioning desiccant wheel; a main section of the apparatus comprising a main desiccant wheel; and a supplementary preconditioning section of the apparatus comprising a supplementary pre-conditioning desiccant wheel. The preconditioning desiccant wheel comprising of two first sectors, namely a first process sector and a first reactivation sector. The main desiccant wheel comprises of at least three second sectors, sequentially including a second outside air sector, a second reactivation sector, and a second process sector. The supplementary pre-conditioning desiccant wheel comprises of two supplementary sectors, namely a supplementary process sector and a supplementary reactivation sector. The ambient airstream is sequentially dehumidified in the supplementary process sector of the supplementary pre-conditioning desiccant wheel, the first process sector of the preconditioning desiccant wheel, followed by dehumidification in the second outside air sector of the main desiccant wheel, before being at least partially supplied for sequential reactivation with a heating unit at the second reactivation sector of the main desiccant wheel, the first reactivation sector of the preconditioning desiccant wheel, followed by supplying with second heating unit at the supplementary reactivation sector of the supplementary pre-conditioning desiccant wheel. Further, the second process sector receives and dehumidifies a combination of a recirculated airstream from a cooling space and at least the portion of the second preconditioned airstream, to output a dehumidified cooled airstream to the cooling space.

Yet another aspect of the present disclosure relates to a method for removing moisture and/or sorbates from airstream and/or other fluid. The method comprises: sequentially dehumidifying the ambient airstream, in a first process sector of a preconditioning desiccant wheel and an outside air sector of a main desiccant wheel; supplying the sequentially dehumidified ambient airstream, to a second reactivation sector of the main desiccant wheel with a heating unit for reactivation thereof, to output a first reactivation airstream; and directly supplying the first reactivation airstream, to a first reactivation sector of the preconditioning desiccant wheel for reactivation thereof, to output a second reactivation airstream. Further, a combination of a recirculated airstream from a cooling space and a portion of the second preconditioned airstream, to a second process sector of the main desiccant wheel, to output a dehumidified cooled airstream to the cooling space.

Yet another aspect of the present disclosure relates to a method for removing moisture and/or sorbates from airstream and/or other fluid. The method comprises: sequentially dehumidifying the ambient airstream, in a supplementary process sector of a supplementary desiccant wheel, a first process sector of a preconditioning desiccant wheel, and an outside air sector of a main desiccant wheel; supplying the sequentially dehumidified ambient airstream, to a second reactivation sector of the main desiccant wheel for reactivation thereof, with a heating unit (10) to output a first reactivation airstream; directly supplying the first reactivation airstream, to a first reactivation sector of the preconditioning desiccant wheel for reactivation thereof, to output a second reactivation airstream; and supplying the second reactivation airstream, to a supplementary reactivation sector of the supplementary desiccant wheel for reactivation thereof, with a second heating unit (4%) to output a final reactivation airstream. Further, a combination of a recirculated room airstream from a cooling space and a portion of the second preconditioned airstream, to the second process sector of the main desiccant wheel, to output a dehumidified cooled airstream to the cooling space.

BRIEF DESCRIPTION OF DRAWINGS

The present invention, both as to its organization and manner of operation, together with further objects and advantages, may best be understood by reference to the following description, taken in connection with the accompanying drawings. These and other details of the present invention will be described in connection with the accompanying drawings, which are furnished only by way of illustration and not in limitation of the invention, and in which drawings: The present invention, which is in the stage of development and testing provides exactly such a system. The invention is described with reference to the appended figures where:

FIG. 2 is a schematic representation of another conventional sorption system for low dew point applications.

DETAILED DESCRIPTION OF THE INVENTION

Figure 1:
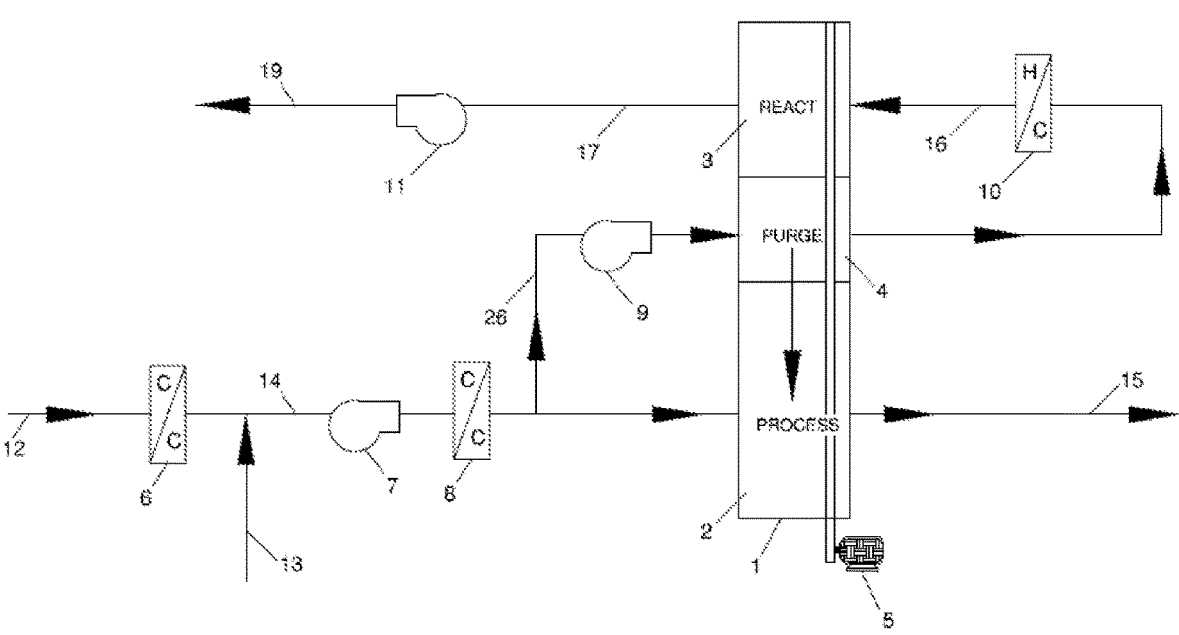
FIG. 1 is a schematic representation of a conventional sorption system for low dew point applications.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

Turning now to a more detailed description of the figures appended to this application: In the appended the figures, the reference numbers are described as follows:

The terms 'system', 'desiccant system', 'apparatus', 'desiccant system', 'sorption system', and 'dehumidifier system', interchangeably, refer to an arrangement of various components for removing moisture and/or sorbates from an airstream and/or other fluid.

The terms 'air', 'airstream', 'airflow', are interchangeably referred to each other, wherein the terms refer to a flowing air or a mass of air.

The terms 'rotor', 'desiccant rotor', 'wheel', and 'desiccant wheel', are interchangeably referred to each other, wherein the terms refer to a rotary wheel carrying a desiccant material thereon, such that moisture is adsorbed on the desiccant material while the air (cooled air) is passed through at least a portion the rotor/desiccant rotor/wheel/desiccant wheel, and moisture is adsorbed on the desiccant material while the air (hot air) is passed through at least another portion the rotor/desiccant rotor/wheel/desiccant wheel.

The terms 'sorbent', 'adsorbent', and 'desiccant', are Interchangeably referred to each other, wherein the terms refer to materials capable of adsorbing moisture/other sorbates.

The terms 'outside air', 'outside airstream', 'ambient air', and 'ambient airstream', are interchangeably referred to each other, wherein the terms refer to air generally available in outside environment.

This Invention:

The underlying premise of the present invention is to harness the exhaust reactivation energy, instead of wasting the same. This wasted reactivation energy is harnessed by using it to regenerate the preconditioning desiccant wheel (33), giving twin benefits. For one, the outside fresh air (ambient air (12)) is preconditioned to a substantially lower degree by way of moisture reduction, before entering outside air sector (4) of main desiccant wheel (1), thus, not only are the moisture contents entering the respective reactivation sectors (3, 36) and the process sector (2) considerably lower. The resultant benefit of the same is that with the lower reactivation inlet dew point, the main desiccant wheel [1] can be regenerated with lower regeneration temperature, hence lower energy, for the same mass fluid, and the process air entering with lower moisture content results in a considerably improved output (lower dew point at the process outlet), respectively, thereby reducing the overall energy required for regeneration, as also providing the ability to produce lower dew points.

Furthermore, 'Fresh air fraction' may be described as the amount of fresh air required (for exhaust from room, and ventilation for people, and pressurization air), excluding that required for reactivation, as a percentage of total supply air. This significantly varies between different applications of low dew points, within different lithium battery technology options, from 2% to 100%. Unlike the prior art, the present invention allows a very high fresh air fraction, to be addressed by the proposed system and yet gives significant energy saving advantages, over all previous prior arts.

FIG. 4(a) is schematic representation configured in such a way to pre-condition the outside air (12) in a preconditioning section having a pre-conditioning desiccant wheel

(33) and is part of single apparatus, whereas the main section referred to as the main section of the apparatus further dehumidifies the outside air (12) to a very low dew point before being partially used for reactivation and the balance mixing with the room return air (13) before being dried in the second process sector (2) of the main desiccant wheel (1) attaining an extremely low dew point down to −90° C. The arrow in the desiccant wheel (1) indicates the sequence in which the desiccant wheel (1) sequentially rotates through the process sector (2); second outside air sector (4), the second reactivation sector (3), and then the second process sector (2) and then back to the second outside air sector (4). It must be understood that the lower the moisture content of the air entering the second reactivation sector (3) of the main desiccant wheel (1) the dryer will be the adsorbent entering the second process sector (2). As the RH of the air entering the second reactivation sector (3) has to be lower than the desired dew point and RH of the second process sector (2) (airstream), it is emphasized that the pre-conditioning desiccant wheel (33) helps reduce the moisture content and RH into the second reactivation sector (3) of the main desiccant wheel (1). As the bulk of the moisture and water has been removed by the first process sector (34) of the preconditioning desiccant wheel (33) and the outside air sector (4) of the main desiccant wheel (1), the amount of moisture that will be removed by the second reactivation sector (3) of the main desiccant wheel (1) is significantly lower than it would have been without the pre-conditioning desiccant wheel (33). This results in limited temperature drop in temperature of the second reactivation sector (3) of the main desiccant wheel (1) and the reactivation out temperature. The object of this invention is to utilize this high temperature reactivation air out from the main desiccant wheel (1), with limited moisture content, to drive out the moisture from the first reactivation sector (36) of the pre-conditioning desiccant wheel (33), without using any additional heat or energy. With this elegant approach not only is it possible to achieve relatively very low dew point in the process air out of the main desiccant wheel (1) but also reduce the overall energy input to the main reactivation heater (10) as the moisture content into the reactivation of the main desiccant wheel (1) has been already substantially reduced. Another outstanding feature of this invention is that not only is it possible to achieve low dew points in the process air (15) with reduced energy input with a heating unit (10) but also manage very large fresh air (12) quantities without sacrificing dew point and with lesser energy input. With these three above advantages of handling high air fraction, lower dew points, and lower energy input, the present invention gives a significant advantage over any other prior art, as will be evident from the examples provided below. As regeneration energy being provided into the second reactivation sector (3) of the main desiccant wheel (1) is a function of the mass flow and temperature, it would be understood that with reduced requirement of the reactivation energy input the option would be available to reduce either or both the temperature and mass flow of the reactivation in air flow (16), resulting in insignificant energy saving.

Details of a first embodiment of the dehumidification system, in accordance with the concepts of the present disclosure, will be explained hereinafter. Referring to FIG. 4a, the dehumidification system includes two sections, i.e.: a main section (51) of the apparatus comprising, a main desiccant wheel (1), a main wheel drive, and a housing provided with internal baffles and air seals proximate to the wheel face to create plenums or sectors and prevent air from leaking between adjacent sectors, to create three paths for air to pass through the wheel; and a preconditioning section (50) of the apparatus comprising a pre-conditioning desiccant wheel (33), a preconditioning wheel drive, and a housing provided with internal baffles and air seals proximate to the wheel face to create plenums or sectors and prevent air from leaking between adjacent sectors, to create two paths for air to pass through the wheel; the preconditioning desiccant wheel (33). The preconditioning desiccant wheel (33) comprising of at least two first sectors for allowing air to pass therethrough. In this embodiment, the preconditioning desiccant wheel (33) includes a first process sector (34) and a first reactivation sector (36). Further, in this embodiment, the main desiccant wheel (1) comprises of at least three second sectors for allowing air to pass therethrough, sequentially including a second outside air sector (4), a second reactivation sector (2), and a second process sector (3). Notably, the main desiccant wheel (1) and the pre-conditioning desiccant wheel (33) are positioned, such that the ambient airstream is sequentially dehumidified in the first process sector (34) of the preconditioning desiccant wheel (33) followed by dehumidification in the outside air sector (4) of the main desiccant wheel (1), before being at least partially supplied for sequential reactivation to the reactivation sector (3) of the main desiccant wheel (1) followed by supplying to the first reactivation sector (36) of the preconditioning desiccant wheel (33). In addition to the aforementioned, in the first embodiment, the dehumidification system also includes a first cooling unit (25), a second cooling unit (6), a third cooling unit (8), and a first heating unit (10), appropriately positioned relative to the main desiccant wheel (1) and the pre-conditioning desiccant wheel (33), for cooling/heating one or more airstreams thereof. Moreover, the dehumidification system also includes deploys one or more fans, namely a first fan (7), a second fan (11), and a third fan (31), for generating one or more airstreams therefrom.

In operation of the first embodiment of the dehumidification system, the first fan (7) is operated to generate ambient airstream (12), for passing through the first process sector (34) of the preconditioning desiccant wheel (33). Notably, a first cooling unit (25) cools the ambient airstream (12), before being dehumidified in the first process sector (34) of the preconditioning desiccant wheel (33). Cooling of the ambient airstream (12) reduces a relative humidity of the ambient airstream (12). Thereafter, the first process sector (34) of the preconditioning desiccant wheel (33), receives and dehumidify ambient airstream (12), to output first preconditioned airstream (46). Such dehumidification further reduces the absolute humidity of the first preconditioned airstream (46), by adsorbing the moisture on desiccant material in the first process sector (34) of the preconditioning desiccant wheel (33). After such dehumidification, the first preconditioned airstream (46) is passed through the second outside air sector (4) of the main desiccant wheel (1). Notably, a second cooling unit (6) cools the first preconditioned airstream (46), before being dehumidified in the second outside air sector (4) of the main desiccant wheel (1). Cooling of the first preconditioned airstream (46) further reduces a relative humidity of the first preconditioned airstream (46). Thereafter, the second outside air sector (4) of the main desiccant wheel (1), receives and further dehumidify the first preconditioned airstream (46) from the first process sector (34), to output the second preconditioned airstream (23). Such dehumidification further reduces the absolute humidity of the second preconditioned airstream (23), by adsorbing the moisture on desiccant material in the second outside air sector (4) of the main desiccant wheel (1).

Accordingly, the ambient air (12) is sequentially dehumidified in the first process sector (34) of the preconditioning desiccant wheel (33) followed by dehumidification at the outside air sector (4) of the main desiccant wheel (1), before being at least partially supplied for sequential reactivation to the second reactivation sector (3) of the main desiccant wheel (1) followed by supplying to the first reactivation sector (36) of the preconditioning desiccant wheel (33). After such dehumidification, a portion (26) of the second preconditioned airstream (23) is supplied to the second process sector (2) of the main desiccant wheel (1), while the second fan (11) operates to sequentially supply another portion (24) of the second preconditioned airstream (23) to the second reactivation sector (3) of the main desiccant wheel (1) and the first reactivation sector (36) of the preconditioning desiccant wheel (33). This portion (26) of the second preconditioned airstream (23) is also termed as 'makeup air (26)', which is mixed with a recirculated air (13) from the cooling room, such that that mixture of the makeup air (26) and the recirculated air (13) is passed through the second process sector (2) of the main desiccant wheel (1). Notably, a third cooling unit (8) cools the mixture of the makeup air (26) and the recirculated air (13), before being dehumidified in the second process sector (2) of the main desiccant wheel (1). The second process sector (2) of the main desiccant wheel (1), receives and dehumidify the mixture of the makeup air (26) and the recirculated air (13), to output a dehumidified cooled airstream (15) to the cooling space. Such dehumidification further reduces the absolute humidity of the dehumidified cooled airstream (15), by adsorbing the moisture on desiccant material in the second process sector (2) of the main desiccant wheel (1). It may be noted that such two-step sequential dehumidification of the ambient airstream in the first process sector (34) of the preconditioning desiccant wheel (33) and the second outside air sector (4) of the main desiccant wheel (1), reduces overall humidity of the second preconditioned airstream (23), before the portion (24) of the same is supplied for sequential reactivation to the second reactivation sector (3) of the main desiccant wheel (1) and the first reactivation sector (36) of the preconditioning desiccant wheel (33). Such low humidity applications of the portion (24) of the second preconditioned airstream (23), reduces overall energy requirements of the system. Concurrent to the dehumidification of the portion (26) of the second preconditioned airstream (23), remaining portion (24) of the second preconditioned airstream (23) is supplied, for sequential reactivation, to the second reactivation sector (3) of the main desiccant wheel (1) and the first reactivation sector (36) of the preconditioning desiccant wheel (33). Particularly, the portion (24) of the second preconditioned airstream (23) is initially supplied for reactivation, to the second reactivation sector (3) of the main desiccant wheel (1). Notably, the first heating unit (10) heats the portion (24) of the second preconditioned airstream (23), before being supplied to the second reactivation sector (3) of the main desiccant wheel (1). Thereafter, the portion (24) of the second preconditioned airstream (23) is supplied to the second reactivation sector (3) of the main desiccant wheel (1), for reactivation thereof, and outputs a first reactivation airstream (17). Such supply of the first reactivation airstream (17) increases the absolute humidity of the first reactivation airstream (17), by removal of the moisture from desiccant material in the second reactivation sector (3) of the main desiccant wheel (1). After such reactivation, the third fan (31) causes the first reactivation airstream (17), to be supplied directly to the first reactivation sector (36) of the pre-conditioning desiccant wheel (33). Notably, the first reactivation airstream (17) is sufficiently high in temperature, and therefore no heating unit is required to heat the first reactivation airstream (17), before being supplied to the first reactivation sector (36) of the pre-conditioning desiccant wheel (33). Accordingly, the system avoids the need of another heating unit, and instead directly reuses the first reactivation airstream (17) to be supplied to the first reactivation sector (36) of the pre-conditioning desiccant wheel (33), thereby firstly reducing energy requirement of the system, secondly ensuring fresh air maintenance, and thirdly in some requirements, also ensuring that the equipment outlet dew point achievement is at levels. Thus, the first reactivation airstream (17) is supplied to the first reactivation sector (36) of the preconditioning desiccant wheel (33) for reactivation thereof, and to output a second reactivation airstream (19), to be vent to external environment. Such reactivation further increases the absolute humidity of the second reactivation airstream (19), by adsorbing the moisture from desiccant material in the first reactivation sector (36) of the preconditioning desiccant wheel (33). Accordingly, it may be said that the portion (24) of the second preconditioned airstream (23), is sequentially supplied to the second reactivation sector (3) of the main desiccant wheel (1) and the first reactivation sector (36) of the preconditioning desiccant wheel (33), before venting to external environment. It may be noted that, in the present embodiment, desiccant wheel (1) is positioned in the section of the apparatus, such that the combination of a recirculated airstream (13) from a cooling space and at least the portion (26) of the second preconditioned airstream (23), and the portion (24) of the second preconditioned airstream (23), pass through the desiccant wheel in the same direction, while the first preconditioned airstream (46) and the portion (24) of the second preconditioned airstream (23), pass through the desiccant wheel in opposite directions. It may be obvious to a person skilled in the art that desiccant wheel (1) may also be positioned in the section of the apparatus, such that, the combination of a recirculated airstream (13) from a cooling space and at least the portion (26) of the second preconditioned airstream (23), and the portion (24) of the second preconditioned airstream (23), pass through the main desiccant wheel (1) in direction opposite that of the portion (24) of the second preconditioned airstream (23)

A method deployed for removing moisture from airstream, comprises: a) sequentially dehumidifying the ambient airstream (12), in one of at least two sectors (34) of the preconditioning desiccant wheel (33) and the outside air sector (4) of the main desiccant wheel (1); b) supplying the sequentially dehumidified ambient airstream, to the second reactivation sector (3) of the main desiccant wheel (1) with the heating unit (10) for reactivation thereof; c) directly supplying the first reactivation airstream, to the first reactivation sector (36) of the preconditioning desiccant wheel (33), to output a second reactivation airstream; and d) supplying, a combination of a recirculated airstream (13) from a cooling space and a portion (26) of the second preconditioned airstream (23), to a second process sector (2) of the main desiccant wheel (1), to output a dehumidified cooled airstream (15) to the cooling space. In accordance with the first embodiment of the dehumidification system, the step (a) of the method comprises: dehumidifying the ambient airstream (12), in the first process sector (34) of the preconditioning desiccant wheel (33), to output a first preconditioned airstream (46); and further dehumidifying the first preconditioned airstream (26), in the second outside air sector (4) of the main desiccant wheel (1), to output the second preconditioned airstream (23). Notably, the method, in accordance with the first embodiment of the dehumidification system, also includes: cooling the ambient airstream (12), by way of the first cooling unit (25), before dehumidification in the first process sector (34) of the preconditioning desiccant wheel (33); and cooling the first preconditioned airstream (26), by way of the second cooling unit (6), before dehumidification in the second outside air sector (4) of the main desiccant wheel (1). Accordingly, the ambient airstream (12) is sequentially dehumidified twice, in the first process sector (34) of the preconditioning desiccant wheel (33) and the second outside air sector (4) of the main desiccant wheel (1), to output the second preconditioned airstream (23). After the step (a) of dehumidification, the step (d) of effective dehumidification is performed, wherein a portion (26) (also termed as makeup air (26)) of the second preconditioned airstream (23) is mixed with the recirculated airstream (13) from a cooling space, and the mixture of the makeup air (26) and the recirculated airstream (13) is passed through the second process sector (2) of the main desiccant wheel (1), to output the dehumidified cooled airstream (15) to the cooling space. Concurrent to such step of effective dehumidification, the steps (b) and (c) of supplying sequentially dehumidified ambient airstream for reactivation is also performed. The step (b) of supplying the sequentially dehumidified ambient airstream for reactivation includes: supplying, to the second reactivation sector (3) of the main desiccant wheel (1), at least the portion (24) of the second preconditioned airstream (23), to output a first reactivation airstream (17). The step (c) of supplying the sequentially dehumidified ambient airstream for reactivation includes: supplying the first reactivation airstream, to the first reactivation sector (19) of the preconditioning desiccant wheel (33), to output a second reactivation airstream (19), to be vent to external environment. Accordingly, the portion (24) of the second preconditioned airstream (23) is supplied for sequential reactivation, to the second reactivation sector (3) of the main desiccant wheel (1) and the first reactivation sector (19) of the preconditioning desiccant wheel (33). Notably, the method, in accordance with the first embodiment of the dehumidification system, also includes: heating the portion (24) of the second preconditioned airstream (23), by way of the heating unit (10), before humidification in the first reactivation sector (3) of the main desiccant wheel (1).

Figure 4:
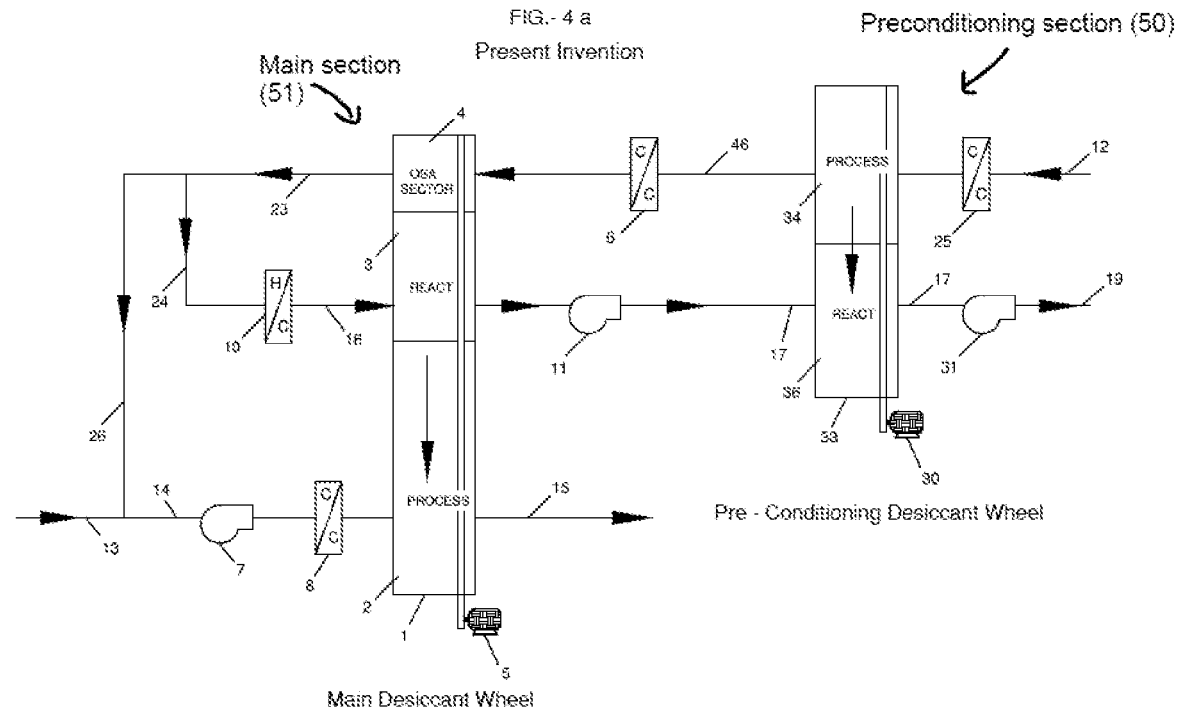
FIG. 4a is a schematic representation of a sorption system, as disclosed in accordance with one embodiment of the present invention.
FIG. 4b is a schematic representation of a sorption system, as disclosed in accordance with further another embodiment of the present invention.
Figure 4:
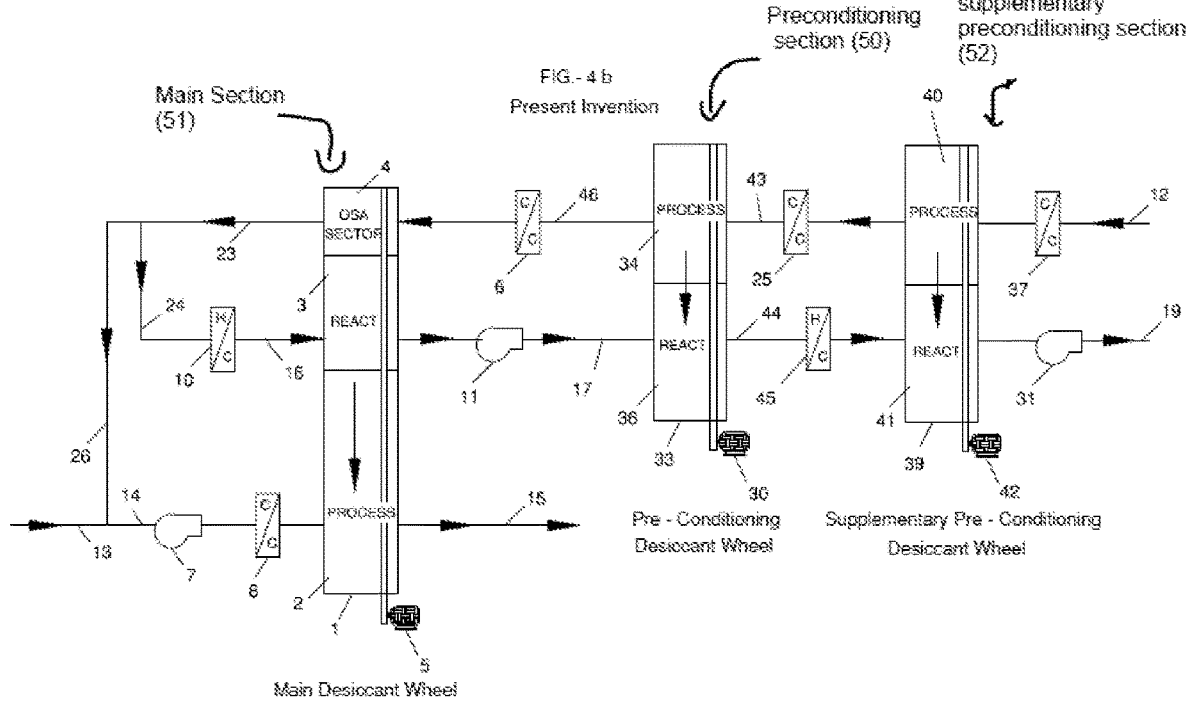

FIG. 4(*b*) is an improved embodiment of this invention by providing a supplementary section having another supplementary pre-conditioning desiccant wheel (39) to further reduce the amount of moisture content in the airstream (23) for further improved reactivation and reduced dew point process air out (15). In this embodiment it is necessary to provide a minimal extra heat (45) to reactivate the supplementary desiccant wheel (39). This embodiment achieves certain additional advantages over the ones explained above for embodiment disclosed in FIG. 4 (*a*).

Details of a second embodiment of the dehumidification system, in accordance with the concepts of the present disclosure, will be explained hereinafter. Referring to FIG. 4b, the dehumidification system includes three sections, i.e., a section of the apparatus with a main desiccant wheel (1); a main wheel drive, wherein a housing is provided with internal baffles and air seals proximate to the wheel face to create plenums or sectors and prevent air from leaking between adjacent sectors, to create three paths for air to pass through the wheel; another section of the apparatus with a pre-conditioning desiccant wheel (33) and a preconditioning wheel drive, wherein a housing is provided with internal baffles and air seals proximate to the wheel face to create plenums or sectors and prevent air from leaking between adjacent sectors, to create two paths for air to pass through the wheel, and yet another section of the apparatus with a supplementary pre-conditioning desiccant wheel (39) and. In this embodiment, the supplementary pre-conditioning desiccant wheel (39) includes a supplementary process sector (40) and a supplementary reactivation sector (41). The preconditioning desiccant wheel (33) includes a first process sector (34) and a first reactivation sector (36). Further, in this embodiment, the main desiccant wheel (1) comprises of at least three second sectors for allowing air to pass therethrough, sequentially including a second outside air sector (4), a second reactivation sector (2), and a second process sector (3). Notably, the main desiccant wheel (1), the preconditioning desiccant wheel (33), and the supplementary pre-conditioning desiccant wheel (39) are positioned, such that the ambient airstream (12) is sequentially dehumidified in the supplementary process sector (40) of the supplementary pre-conditioning desiccant wheel (39), the first process sector (34) of the preconditioning desiccant wheel (33), and the outside air sector (4) of the main desiccant wheel (1), before being at least partially supplied for sequential reactivation to the reactivation sector (3) of the main desiccant wheel (1), the first reactivation sector (36) of the preconditioning desiccant wheel (33), and the supplementary reactivation sector (41) of the supplementary pre-conditioning desiccant wheel (39). In addition to the aforementioned, in the first embodiment, the dehumidification system also includes a first cooling unit (25), a second cooling unit (6), a third cooling unit (8), and a first heating unit (10), and a third heating unit (45), appropriately positioned relative to the main desiccant wheel (1), the pre-conditioning desiccant wheel (33), and the supplementary pre-conditioning desiccant wheel (39), for cooling/heating one or more airstreams thereof. Moreover, the dehumidification system also includes one or more fans, namely a first fan (7), a second fan (11), and a third fan (31), for generating one or more airstreams therefrom.

In operation of the second embodiment of the dehumidification system, the first fan (7) is operated to generate ambient airstream (12), for passing through the supplementary process sector (40) of the supplementary pre-conditioning desiccant wheel (39). Notably, a supplementary cooling unit (37) cools the ambient airstream (12), before being dehumidified in the supplementary process sector (40) of the preconditioning desiccant wheel (39). Cooling of the ambient airstream (12) reduces a relative humidity of the ambient airstream (12). Thereafter, the supplementary process sector (40) of the supplementary preconditioning desiccant wheel (39), receives and dehumidify ambient airstream (12), to output a supplementary first preconditioned airstream (43). Such dehumidification further reduces the absolute humidity of the supplementary preconditioned airstream (43), by adsorbing the moisture on desiccant material in the supplementary process sector (40) of the supplementary preconditioning desiccant wheel (39). After such dehumidification, the supplementary preconditioned airstream (43) is passed through the first process sector (34) of the preconditioning desiccant wheel (33). Notably, the first cooling unit (25) cools the supplementary preconditioned airstream (43), before being dehumidified in the first process sector (34) of the preconditioning desiccant wheel (33). Cooling of the supplementary preconditioned airstream (43) reduces a relative humidity of the ambient airstream (12). Thereafter, the first process sector (34) of the preconditioning desiccant wheel (33), receives and dehumidify supplementary preconditioned airstream (43), to output first preconditioned airstream (46). Such dehumidification further reduces the absolute humidity of the first preconditioned airstream (46), by adsorbing the moisture on desiccant material in the first process sector (34) of the preconditioning desiccant wheel (33). After such dehumidification, the first preconditioned airstream (46), is passed through the second outside air sector (4) of the main desiccant wheel (1). Notably, a second cooling unit (6) cools the first preconditioned airstream (46), before being dehumidified in the second outside air sector (4) of the main desiccant wheel (1). Cooling of the first preconditioned airstream (46) further reduces the relative humidity of the first preconditioned airstream (46). Thereafter, the second outside air sector (4) of the main desiccant wheel (1), receives and further dehumidify the first preconditioned airstream (46) from the first process sector (34), to output the second preconditioned airstream (23). Such dehumidification further reduces the absolute humidity of the second preconditioned airstream (23), by adsorbing the moisture on desiccant material in the second outside air sector (4) of the main desiccant wheel (1). Accordingly, the ambient air (12) is sequentially dehumidified in each of the supplementary process sector (39) of the supplementary desiccant wheel (39), the first process sector (34) of the preconditioning desiccant wheel (33), and the outside air sector (4) of the main desiccant wheel (1), before being at least partially supplied for sequential reactivation to the second reactivation sector (3) of the main desiccant wheel (1), the first reactivation sector (36) of the pre conditioning desiccant wheel (33), and the supplementary reactivation sector (41) of the supplementary preconditioning desiccant wheel (39). After such dehumidification, the portion (26) of the second preconditioned airstream (23) is supplied to through the second process sector (2) of the main desiccant wheel (1), while the second fan (11) operates to sequentially supply another portion (24) of the second preconditioned airstream (23) to the second reactivation sector (3) of the main desiccant wheel (1), the first reactivation sector (36) of the preconditioning desiccant wheel (33), and the supplementary reactivation sector (41) of the supplementary pre-conditioning desiccant wheel (39). This portion (26) of the second preconditioned airstream (23) is also termed as 'makeup air (26)', which is mixed with a recirculated air (13) from the cooling room, such that that mixture of the makeup air (26) and the recirculated air (13) is passed through the second process sector (2) of the main desiccant wheel (1). Notably, a third cooling unit (8) cools the mixture of the makeup air (26) and the recirculated air (13), before being dehumidified in the second process sector (2) of the main desiccant wheel (1). The second process sector (2) of the main desiccant wheel (1), receives and dehumidify the mixture of the makeup air (26) and the recirculated air (13), to output a dehumidified cooled airstream (15) to the cooling space. Such dehumidification further reduces the absolute humidity of the dehumidified cooled airstream (15), by adsorbing the moisture on desiccant material in the second process sector (2) of the main desiccant wheel (1). It may be noted that such three-step sequential dehumidification of the ambient airstream in the supplementary process sector (40) of the supplementary desiccant wheel (39), the first process sector (34) of the preconditioning desiccant wheel (33), and the second outside air sector (4) of the main desiccant wheel (1), reduces overall humidity of the second preconditioned airstream (23), before the portion (24) of the same is supplied for sequential reactivation to the second reactivation sector (3) of the main desiccant wheel (1) and the first reactivation sector (36) of the preconditioning desiccant wheel (33). Such low humidity applications of the portion (24) of the second preconditioned airstream (23), reduces overall energy requirements of the system. Concurrent to the dehumidification of the portion (26) of the second preconditioned airstream (23), remaining portion (24) of the second preconditioned airstream (23) is supplied for sequential reactivation, to the supplementary process sector (40) of the supplementary desiccant wheel (39), the second reactivation sector (3) of the main desiccant wheel (1), and the first reactivation sector (36) of the preconditioning desiccant wheel (33). Particularly, the portion (24) of the second preconditioned airstream (23) is initially supplied for reactivation, to the second reactivation sector (3) of the main desiccant wheel (1). Notably, the first heating unit (10) heats the portion (24) of the second preconditioned airstream (23), before being supplied for reactivation to the second reactivation sector (3) of the main desiccant wheel (1). Thereafter, the portion (24) of the second preconditioned airstream (23), and outputs a first reactivation airstream (17). Such humidification of the first reactivation airstream (17) increases the absolute humidity of the first reactivation airstream (17), by removal of the moisture from desiccant material in the second reactivation sector (3) of the main desiccant wheel (1). After such supply for reactivation, the first reactivation airstream (17) is passed through the first reactivation sector (36) of the pre-conditioning desiccant wheel (33). Thereafter, the first reactivation sector (36) of the preconditioning desiccant wheel (33), receives for reactivation thereof the first reactivation airstream (17), to output a supplementary reactivation airstream (44). Such supply for reactivation increases the absolute humidity of the supplementary reactivation airstream (44), by adsorbing the moisture from desiccant material in the first reactivation sector (36) of the preconditioning desiccant wheel (33). After such humidification, the third fan (31) causes the supplementary reactivation airstream (44), to be passed through the supplementary reactivation sector (41) of the supplementary preconditioning desiccant wheel (39). Notably, a third heating unit (45) heats the supplementary reactivation airstream (44), before being humidified in the supplementary reactivation sector (41) of the supplementary pre-conditioning desiccant wheel (39). Thereafter, the supplementary reactivation sector (41) of the supplementary preconditioning desiccant wheel (39), receives and humidifies the supplementary reactivation airstream (44), to output a second reactivation airstream (19). Such supply for reactivation further increases the absolute humidity of the second reactivation airstream (19), by adsorbing the moisture from desiccant material in the supplementary reactivation sector (41) of the supplementary preconditioning desiccant wheel (39). Accordingly, it may be said that the portion (24) of the second preconditioned airstream (23), is sequentially supplied in the second reactivation sector (3) of the main desiccant wheel (1), the first reactivation sector (36) of the preconditioning desiccant wheel (33), and the supplementary reactivation sector (41) of the supplementary preconditioning desiccant wheel (39), before venting to external environment.

A method deployed for removing moisture from airstream, comprises: a) sequentially dehumidifying the ambient airstream (12); b) supplying the sequentially dehumidified ambient airstream, to the second reactivation sector (3) of the main desiccant wheel (1) for reactivation thereof; c) directly supplying the first reactivation airstream, to the first reactivation sector (36) of the preconditioning desiccant wheel (33), to output a second reactivation airstream; and d) supplying the supplementary reactivation airstream, to the supplementary reactivation sector (41) of the supplementary preconditioning desiccant wheel (39), to output the second reactivation airstream. In accordance with the second embodiment of the dehumidification system, the step (a) of the method comprises: dehumidifying the ambient airstream (12), in the supplementary process sector (40) of the supplementary desiccant wheel (39), to output a supplementary preconditioned airstream; dehumidifying the supplementary preconditioned airstream, in the first process sector (34) of the preconditioning desiccant wheel (33), to output a first preconditioned airstream (46); and further dehumidifying the first preconditioned airstream (26), in the second outside air sector (4) of the main desiccant wheel (1), to output the second preconditioned airstream (23). Notably, the method, in accordance with the first embodiment of the dehumidification system, also includes: cooling the ambient airstream (12), by way of the supplementary cooling unit (37), before dehumidification in the supplementary process sector (40) of the supplementary preconditioning desiccant wheel (39); cooling the supplementary preconditioned airstream (43), by way of the first cooling unit (25), before dehumidification in the first process sector (34) of the preconditioning desiccant wheel (33); and cooling the first preconditioned airstream (26), by way of the second cooling unit (6), before dehumidification in the second outside air sector (4) of the main desiccant wheel (1). Accordingly, the ambient airstream (12) is sequentially dehumidified thrice in, the supplementary process sector (40) of the supplementary desiccant wheel (39), the first process sector (34) of the preconditioning desiccant wheel (33), and the second outside air sector (4) of the main desiccant wheel (1), to output the second preconditioned airstream (23). After the step (a) of dehumidification, the step of effective dehumidification is performed, wherein a portion (26) (also termed as makeup air (26)) of the second preconditioned airstream (23) is mixed with the recirculated airstream (13) from a cooling space, and the mixture of the makeup air (26) and the recirculated airstream (13) is passed through the second process sector (2) of the main desiccant wheel (1), to output the dehumidified cooled airstream (15) to the cooling space. Concurrent to such step of affective dehumidification, the step (b) of humidification is also performed. The step (b) of supplying for reactivation includes: supplying for reactivation, to the second reactivation sector (3) of the main desiccant wheel (1), the portion (24) of the second preconditioned airstream (23), to output a first reactivation airstream. The step (c) of supplying for reactivation includes: supplying for reactivation, to the first reactivation sector (36) of the preconditioning desiccant wheel (33), the first reactivation airstream (17), to output supplementary reactivation airstream (44); and the step (d) of supplying for reactivation includes: supplying for reactivation, to the supplementary reactivation airstream (44) of the supplementary preconditioning desiccant wheel (39), to output the second reactivation airstream to be vent to external environment. Accordingly, the portion (24) of the second preconditioned airstream (23) is sequentially supplied for reactivation, to the second reactivation sector (3) of the main desiccant wheel (1), the first reactivation sector (19) of the preconditioning desiccant wheel (33), and the supplementary reactivation sector (41) of the supplementary preconditioning desiccant wheel (39). Notably, the method, in accordance with the second embodiment of the dehumidification system, also includes: heating the portion (24) of the second preconditioned airstream (23), by way of the first heating unit (10), before humidification in the first reactivation sector (3) of the main desiccant wheel (1); and heating the supplementary reactivation airstream (44), by way of the third heating unit (45), before humidification in the supplementary reactivation sector (41) of the supplementary preconditioning desiccant wheel (39).

Various advantages of the dehumidification system, as disclosed in the embodiments above, exists. In particular, as the dehumidified second preconditioned air (23), dehumidified in the first process sector (34) of the preconditioning desiccant wheel (33) and the outside air sector (4) of the main desiccant wheel (1), is supplied for reactivation at the second reactivation sector (3) of the main desiccant wheel (1), it causes more and effective removal of moisture from the second reactivation sector (3) of the main desiccant wheel (1), causing more desiccant available for dehumidification in the second process sector (2) of the main desiccant wheel (1). This increases overall efficiency of the main desiccant wheel (1). Additionally, as such dehumidified second preconditioned air (23) is supplied for reactivation at the second reactivation sector (3) of the main desiccant wheel (1), it reduces load on the first heating unit (10) for heating the portion (24) of the second preconditioned air (23), causing reduced electrical energy requirements. This reduces electrical energy requirements of the disclosed dehumidification system.

Figure 3:
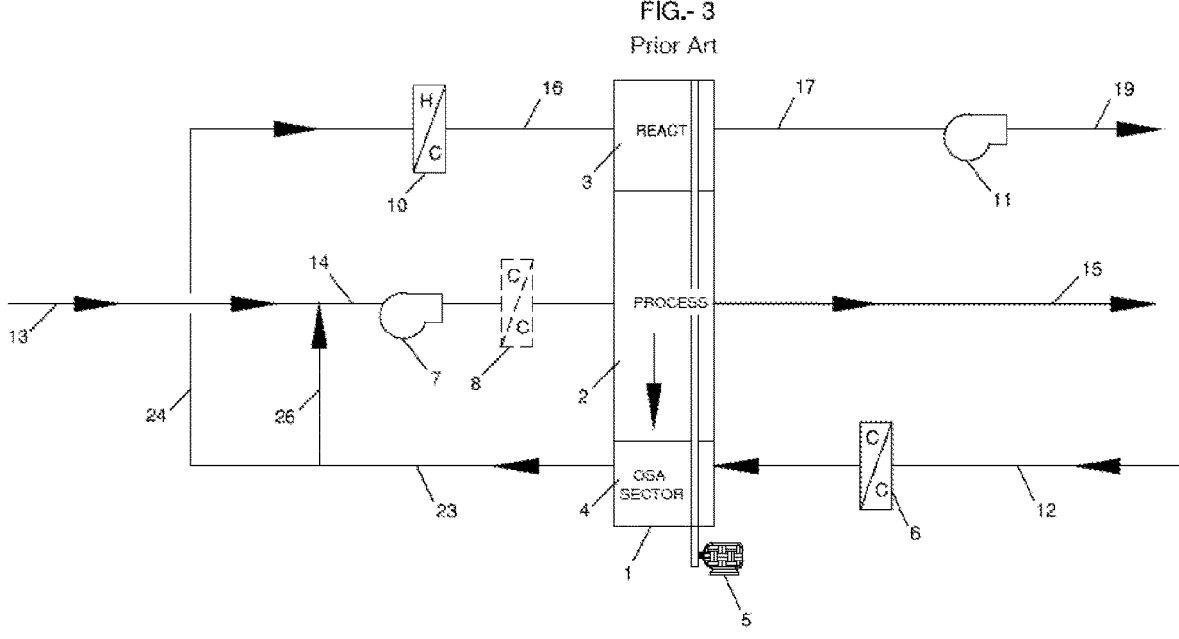
FIG. 3 is a schematic representation of yet another conventional sorption system for low dew point applications (described in U.S. Pat. No. 9,303,884 as FIG. 7 therein).

40 kW, whereas the total reactivation energy consumed by the dehumidification system disclosed in the present invention in FIG. 4 is 32 kW, thereby achieving an energy saving of 20%. Similarly, at the same dehumidifier supply air qty of 10000 CMH and increased fresh air fraction % of 25%, the total reactivation energy consumed by the dehumidification system disclosed in FIG. 3 is 84 kW, whereas the total reactivation energy consumed by the dehumidification system disclosed in the present invention in FIG. 4 is 43 kW, thereby achieving an energy saving of 49%. Similarly, to the above, at the same dehumidifier supply air qty of 10000 CMH and further increased fresh air fraction % of 50%, the total reactivation energy consumed by the dehumidification system disclosed in FIG. 3 is 128 kW, whereas the total reactivation energy consumed by the dehumidification system disclosed in the present invention in FIG. 4 is 75 kW, thereby achieving an energy saving of 41%. Accordingly, it is submitted that the dehumidification system disclosed in the present invention provides for greater energy savings, over the dehumidification system disclosed in FIG. 3 as prior art.

TABLE 1

Energy comparison sheet Prior Art (FIG. 3) vs Present Invention (FIG. 4)

| | Dehumidifier Supply air qty. (CMH) | Return Air dew point (° C.) | Supply Air Dew point (° C.) | Fresh air Fraction (%) | React. Heater KW | Process CMH/React. Kw | React Energy consumed (%) | % Energy Saving |
|---|---|---|---|---|---|---|---|---|
| Prior Art (FIG. 3) | 10000 | (−)40 | (−)60 | 10 | 40 | 250 | 100 | 20 |
| Present Invention (FIG. 4) | | | | | 32 | 313 | 80 | |
| Prior Art (FIG. 3) | 10000 | (−)40 | (−)60 | 25 | 84 | 119 | 100 | 49 |
| Present Invention (FIG. 4) | | | | | 43 | 233 | 51 | |
| Prior Art (FIG. 3) | 10000 | (−)40 | (−)60 | 50 | 128 | 78 | 100 | 41 |
| Present Invention (FIG. 4) | | | | | 75 | 133 | 59 | |

Notes:
1. Fresh Air Fraction is amount of fresh air excluding reactivation air, as part of room supply air as % of total dehumidified supply air.

To further explain the benefits resulting from the invention explained in FIG. 4 (*a*), provided below are three examples.

Example 1

In this example, the energy consumption for three different scenarios of varying fresh air quantity, i.e. fresh air fraction, within the overall same supply air flow have been compared between the prior art and the present invention.

In particular, table 1 shows a comparison data sheet comparing energy consumption of dehumidification system disclosed in FIG. 3, with respect to the disclosed dehumidification system, for a defined dehumidifier supply air qty. and different fresh fraction percentages. For example, at the given dehumidifier supply air qty of 10000 CMH and fresh air fraction % of 10%, the total reactivation energy consumed by the dehumidification system disclosed in FIG. 3 is Example 2

In this example, for the same supply air quantity, for the same fresh air fraction, for the same delivered dew point, and for the same return air dew point in the room, the reactivation energy consumption of the prior art and the present invention are compared.

In particular, table 2 shows a comparison data sheet of comparing energy consumption of dehumidification system disclosed in FIG. 3, with respect to the disclosed dehumidification system of the present invention, for a particular defined dehumidifier supply air qty. of 8000 CMH and fresh fraction of 20%. As is shown in table 2, at the dehumidifier supply air qty of 8000 CMH and the fresh air fraction % of 20%, the total reactivation energy consumed by the dehumidification system disclosed in FIG. 3 relating to the prior art is 69 kW, whereas the total reactivation energy consumed by the dehumidification system disclosed in FIG. 4 relating to the present invention is 33 kW, thereby achieving an energy saving of 52%. Accordingly, very high energy savings is observed, with use of the preconditioning section (50) of the dehumidification system disclosed in the present invention.

the dehumidification system disclosed in FIG. 3 is 10° C., whereas the outside air inlet dew point of the dehumidification system disclosed in FIG. 4 is −4° C., respectively.

Similarly, for the same dehumidifier supply air qty of 10000 CMH and the first selected fresh air fraction % of

TABLE 2

Energy comparison sheet Prior Art (FIG. 3) vs Present Invention (FIG. 4)

| | Dehumidifier Supply air qty. (CMH) | Return Air dew point (° C.) | Supply Air Dew point (° C.) | Fresh air Fraction (%) | React. Heater KW | Process CMH/React. Kw | React Energy consumed (%) | % Energy Saving |
|---|---|---|---|---|---|---|---|---|
| Prior Art (FIG. 3) | 8000 | (−)45 | (−)65 | 20 | 69 | 116 | 100 | 52 |
| Present Invention (FIG. 4) | | | | | 33 | 242 | 48 | |

Notes:
1. Fresh Air Fraction is amount of fresh air excluding reactivation air, as part of room supply air as % of total dehumidified supply air.

Example 3

In this example, for two different fresh air fractions, a comparison has been made of the outside air inlet dew point (46) to the main desiccant wheel (1), and also the reactivation inlet dew points (24) to the main desiccant wheel (1), for the prior art and the present invention.

In particular, table 3 shows a comparison data sheet for comparing:

a) inlet dew points of reactivation inlets (24) of the main desiccant wheel (1), and b) Inlet dew points to the outside air section (OSA) (4) of the main desiccant wheel (1), of a dehumidification system disclosed in FIG. 3 relating to prior art, with respect to the disclosed dehumidification system dis- 10%, the reactivation air inlet dew point of the dehumidification system disclosed in FIG. 3 is −20° C., whereas the reactivation air inlet dew point of the dehumidification system disclosed in FIG. 4 is −42° C., respectively. In case of second selected increased fresh air fractions of 25%, for the same air quantity, the reactivation air inlet dew point of the dehumidification system disclosed in FIG. 3 is −31° C., whereas the reactivation air inlet dew point of the dehumidification system disclosed in FIG. 4 is −39° C., respectively.

TABLE 3

Performance comparison sheet Prior Art (FIG. 3) vs Present Invention (FIG. 4)

| | Dehumidifier Supply air qty. (CMH) | Return Air dew point (° C.) | Supply Air Dew point (° C.) | Fresh air Fraction (%) | Outside Air Inlet Dew Point (° C.) | React. Air Inlet Dew Point (° C.) |
|---|---|---|---|---|---|---|
| Prior Art (FIG. 3) | 10000 | (−)40 | (−)60 | 10 | 10 | (−)20 |
| Present Invention (FIG. 4) | | | | | (−)12 | (−)42 |
| Prior Art (FIG. 3) | 10000 | (−)40 | (−)60 | 25 | 10 | (−)31 |
| Present Invention (FIG. 4) | | | | | (−)4 | (−)39 |

Notes:
1. Fresh Air Fraction is amount of fresh air excluding reactivation air, as part of room supply air as % of total dehumidified supply air.

closed in FIG. 4 relating to the present invention, for the same defined dehumidifier supply air qty., but for two different fresh air fractions.

For example, at a dehumidifier supply air qty of 10000 CMH and a fresh air fraction % of 10%, the outside air inlet dew point of the dehumidification system disclosed in FIG. 3 is 10° C., whereas the outside air inlet dew point of the dehumidification system disclosed in FIG. 4 is −12° C., respectively. In case of increased fresh air fractions of 25%, for the same air quantity, the outside air inlet dew point of In light of the testing conducted and results achieved as presented above, it is evident that the present invention with its various embodiments, is able to achieve significant technical advancements over and above the conventional designs available and known in the art.

While the preferred embodiments of the present invention have been described hereinabove, it should be understood that various changes, adaptations, and modifications may be made therein without departing from the spirit of the invention and the scope of the appended claims. It will be obvious to a person skilled in the art that the present invention may be embodied in other specific forms without departing from its spirit or essential characteristics. The described embodiments are to be considered in all respects only as illustrative and not restrictive.

We claim:

1. An apparatus, comprising:

a preconditioning section of the apparatus comprising a preconditioning desiccant wheel comprising of two first sectors, namely a first process sector and a first reactivation sector; and a main section of the apparatus comprising a main desiccant wheel comprising of at least three second sectors, sequentially including an outside air sector, a second reactivation sector, and a second process sector, wherein an ambient airstream is sequentially dehumidified in the first process sector of the preconditioning desiccant wheel followed by dehumidification in the outside air sector of the main desiccant wheel, before being at least partially supplied for sequential reactivation with a heating unit at the second reactivation sector of the main desiccant wheel followed by supplying to the first reactivation sector of the preconditioning desiccant wheel, and the second process sector receives and dehumidifies a combination of a recirculated airstream from a cooling space and at least a first portion of a second preconditioned airstream, to output a dehumidified cooled airstream to the cooling space.

2. The apparatus as claimed in claim 1, wherein the first process sector of the preconditioning desiccant wheel, receives and dehumidifies the ambient airstream, to output a first preconditioned airstream, the outside air sector of the main desiccant wheel, receives and further dehumidifies the first preconditioned airstream from the first process sector, to output the second preconditioned airstream, the second reactivation sector of the main desiccant wheel, receives and supplies at least the portion of the second preconditioned airstream for reactivation thereof, and outputs a first reactivation airstream, and the first reactivation sector of the preconditioning desiccant wheel, receives and directly supplies the first reactivation airstream for reactivation thereof, to output a second reactivation airstream.

3. The apparatus as claimed in claim 1, wherein the main desiccant wheel is positioned in the main section of the apparatus such that the combination of the recirculated airstream from the cooling space and at least the first portion of the second preconditioned airstream, and a second portion of the second preconditioned airstream, pass through the main desiccant wheel in the same direction, while a first preconditioned airstream and the second portion of the second preconditioned airstream pass through the main desiccant wheel in opposite directions.

4. The apparatus as claimed in claim 1, wherein said main desiccant wheel is positioned in the main section of the apparatus such that the combination of the recirculated airstream from the cooling space and at least the first portion of the second preconditioned airstream, and a second portion of the second preconditioned airstream, pass through the main desiccant wheel in a direction opposite that of the second preconditioned airstream.

5. The apparatus as claimed in claim 1, further comprising a cooling unit for precooling the ambient airstream to remove some of a water from the ambient airstream by condensation, and deliver for being dehumidified in the first process sector of the preconditioning desiccant wheel.

6. The apparatus as claimed in claim 1, further comprising a cooling unit for cooling a first preconditioned airstream before being dehumidified in the outside air sector of the main desiccant wheel.

7. The apparatus as claimed in claim 1, further comprising a cooling unit for cooling the combination of the recirculated airstream from the cooling space and at least the portion of the second preconditioned airstream, before being dehumidified at the second process sector of the main desiccant wheel, improving the moisture removal through the second process sector of the main desiccant wheel.

8. The apparatus as claimed in claim 1, wherein the preconditioning section further comprises a preconditioning wheel drive, and a housing with internal baffles and air seals proximate to a wheel face to create plenums or sectors and prevent air from leaking between adjacent sectors, to create two paths for air to pass through the preconditioning desiccant wheel.

9. The apparatus as claimed in claim 1, wherein the main section further comprises a main wheel drive, and a housing with internal baffles and air seals proximate to a wheel face to create plenums or sectors and prevent air from leaking between adjacent sectors, to create three paths for air to pass through the main desiccant wheel.

10. The apparatus as claimed in claim 1, wherein the apparatus is configured to remove at least one of moisture or sorbates from an airstream or other fluid wherein the other fluid comprises, but is not limited to, $CO_2$ and VOC.

11. The apparatus as claimed in claim 1, wherein the preconditioning desiccant wheel and the main desiccant wheel have desiccant selected from the group consisting of silica gel, molecular sieve, metal-organic framework (MOFs), covalent organic framework (COFs), and zeolite imidazolate frameworks (ZIFs).

12. An apparatus, comprising:

a preconditioning section of the apparatus comprising a preconditioning desiccant wheel comprising of two first sectors, namely a first process sector and a first reactivation sector; and a main section of the apparatus comprising a main desiccant wheel comprising of at least three second sectors, sequentially including an outside air sector, a second reactivation sector, and a second process sector, and a supplementary preconditioning section of the apparatus comprising a supplementary pre-conditioning desiccant wheel comprising of two supplementary sectors, namely a supplementary process sector and a supplementary reactivation sector, wherein an ambient airstream is sequentially dehumidified in the supplementary process sector of the supplementary pre-conditioning desiccant wheel, the first process sector of the preconditioning desiccant wheel, followed by dehumidification in the outside air sector of the main desiccant wheel, before being at least partially supplied for sequential reactivation with a heating unit at the second reactivation sector of the main desiccant wheel, followed by supplying to the first reactivation sector of the preconditioning desiccant wheel, and a second heating unit at the supplementary reactivation sector of the supplementary pre-conditioning desiccant wheel, the second process sector receives and dehumidifies a combination of a recirculated airstream from a cooling space and at least a first portion of a second preconditioned airstream, to output a dehumidified cooled airstream to the cooling space.

13. The apparatus as claimed in claim 12, wherein the supplementary process sector of the supplementary pre-conditioning desiccant wheel, receives and dehumidifies the ambient airstream, to output a supplementary preconditioned airstream, the first process sector of the preconditioning desiccant wheel, receives and dehumidifies the supplementary preconditioned airstream, to output a first preconditioned airstream, the outside air sector of the main desiccant wheel, receives and further dehumidify the first preconditioned airstream from the first process sector, to output the second preconditioned airstream, the second reactivation sector of the main desiccant wheel, receives and supplies at least the portion of the second preconditioned airstream for reactivation thereof, and outputs a first reactivation airstream, and the first reactivation sector of the preconditioning desiccant wheel, receives and directly supplies the first reactivation airstream for reactivation thereof, and outputs a second reactivation airstream; and the supplementary reactivation sector of the supplementary pre-conditioning desiccant wheel, receives and supplies the second reactivation airstream for reactivation thereof, and output a supplementary reactivation airstream.

14. The apparatus as claimed in claim 12, wherein the main desiccant wheel is positioned in the main section of the apparatus such that the combination of the recirculated airstream from the cooling space, and at least the first portion of the second preconditioned airstream, and a second portion of the second preconditioned airstream, pass through the main desiccant wheel in the same direction, while a first preconditioned airstream and the second portion of the second preconditioned airstream, pass through the main desiccant wheel in opposite directions.

15. The apparatus as claimed in claim 12, wherein the main desiccant wheel is positioned in the main section of the apparatus such that the combination of the recirculated airstream from the cooling space, and at least the first portion of the second preconditioned airstream, and a second portion of the second preconditioned airstream, pass through the main desiccant wheel in a direction opposite that of the second preconditioned airstream.

16. The apparatus as claimed in claim 12, further comprising a supplementary cooling unit for precooling the ambient airstream to remove some of a water from the ambient airstream by condensation, and deliver for being dehumidified in the supplementary process sector of the supplementary desiccant wheel.

17. The apparatus as claimed in claim 12, further comprising a cooling unit for cooling the supplementary preconditioned airstream before being dehumidified in the first process sector of the preconditioning desiccant wheel.

18. The apparatus as claimed in claim 12, further comprising a cooling unit for cooling a first preconditioned airstream before being dehumidified in the outside air sector of the main desiccant wheel.

19. The apparatus as claimed in claim 12, further comprising a cooling unit for cooling the combination of the recirculated airstream from the cooling space and at least the portion of the second preconditioned airstream, before being dehumidified at the second process sector of the main desiccant wheel, improving the moisture removal through the second process sector of the main desiccant wheel.

20. The apparatus as claimed in claim 12, wherein the preconditioning section further comprises a preconditioning wheel drive, and a housing with internal baffles and air seals proximate to a wheel face to create plenums or sectors and prevent air from leaking between adjacent sectors, to create two paths for air to pass through the preconditioning desiccant wheel.

21. The apparatus as claimed in claim 12, wherein the main section further comprises a main wheel drive, and a housing with internal baffles and air seals proximate to a wheel face to create plenums or sectors and prevent air from leaking between adjacent sectors, to create three paths for air to pass through the main desiccant wheel.

22. The apparatus as claimed in claim 12, wherein the supplementary preconditioning section further comprises a supplementary wheel drive, and a housing with internal baffles and air seals proximate to a wheel face to create plenums or sectors and prevent air from leaking between adjacent sectors, to create two paths for air to pass through the wheel.

23. The apparatus as claimed in claim 12, wherein the other fluid comprises, but is not limited to, $CO_2$ and VOC.

24. The apparatus as claimed in claim 12, wherein the preconditioning desiccant wheel and the main desiccant wheel have desiccant selected from the group consisting of silica gel, molecular sieve, metal-organic framework (MOFs), covalent organic framework (COFs), and zeolite imidazolate frameworks (ZIFs).

25. A method, comprising:

sequentially dehumidifying an ambient airstream, in a first process sector of a preconditioning desiccant wheel and an outside air sector of a main desiccant wheel, and supplying the sequentially dehumidified ambient airstream, to a second reactivation sector of the main desiccant wheel with a heating unit for reactivation thereof, to output a first reactivation airstream, and directly supplying the first reactivation airstream, to a first reactivation sector of the preconditioning desiccant wheel for reactivation thereof, to output a second reactivation airstream, and supplying, a combination of a recirculated airstream from a cooling space and a first portion of a second preconditioned airstream, to a second process sector of the main desiccant wheel, to output a dehumidified cooled airstream to the cooling space.

26. The method as claimed in claim 25, wherein the step of sequentially dehumidifying the ambient airstream includes:

dehumidifying the ambient airstream, in the first process sector of the preconditioning desiccant wheel, to output a first preconditioned airstream, and further dehumidifying the first preconditioned airstream, in an outside air sector of the main desiccant wheel, to output a second preconditioned airstream.

27. The method as claimed in claim 25, further comprising precooling, using a cooling unit, the ambient airstream to remove some of a water from the ambient airstream by condensation, and deliver for dehumidification in the first process sector of the preconditioning desiccant wheel.

28. The method as claimed in claim 25, further comprising cooling, using a cooling unit, a first preconditioned airstream, before dehumidification in the outside air sector of the main desiccant wheel.

29. The method as claimed in claim 25, further comprising cooling, using a cooling unit, the combination of the recirculated room airstream from the cooling space and the portion of the second preconditioned airstream, before dehumidification in the second process sector of the main desiccant wheel, improving the moisture removal through the second process sector of the main desiccant wheel.

30. A method, comprising:

sequentially dehumidifying an ambient airstream, in a supplementary process sector of a supplementary desiccant wheel, a first process sector of a preconditioning desiccant wheel, and an outside air sector of a main desiccant wheel, supplying the sequentially dehumidified ambient airstream, to a second reactivation sector of the main desiccant wheel for reactivation thereof, with a heating unit to output a first reactivation airstream, directly supplying the first reactivation airstream, to a first reactivation sector of the preconditioning desiccant wheel for reactivation thereof, to output a second reactivation airstream, and supplying the second reactivation airstream, to a supplementary reactivation sector of the supplementary desiccant wheel for reactivation thereof, with a second heating unit to output a final reactivation airstream, and supplying, a combination of a recirculated room airstream from a cooling space and a first portion of a second preconditioned airstream, to the second process sector of the main desiccant wheel, to output a dehumidified cooled airstream to the cooling space.

31. The method as claimed in claim 30, wherein dehumidifying the ambient airstream, in the supplementary process sector of the supplementary desiccant wheel, to output a supplementary preconditioned airstream, dehumidifying the supplementary preconditioned airstream, in the first process sector of the preconditioning desiccant wheel, to output a first preconditioned airstream, dehumidifying the first preconditioned airstream, in an outside air sector of the main desiccant wheel, to output the second preconditioned airstream.

32. The method as claimed in claim 30, further comprising cooling, using a supplementary cooling unit, the ambient airstream to remove some of a water from the ambient airstream by condensation, and deliver for dehumidification in the supplementary process sector of the supplementary desiccant wheel.

33. The method as claimed in claim 30, further comprising cooling, using a cooling unit, a supplementary preconditioned airstream, before dehumidification in the first process sector of the preconditioning desiccant wheel.

34. The method as claimed in claim 30, further comprising cooling, using a cooling unit, a first preconditioned airstream, before dehumidification in the outside air sector of the main desiccant wheel.

35. The method as claimed in claim 30, further comprising cooling, using a cooling unit, the combination of the recirculated room airstream from the cooling space and the portion of the second preconditioned airstream, before dehumidification in the second process sector of the main desiccant wheel, improving the moisture removal through the second process sector of the main desiccant wheel.

* * * * *